US 12,475,238 B2

(12) United States Patent
Ishikawa

(10) Patent No.: US 12,475,238 B2
(45) Date of Patent: Nov. 18, 2025

(54) INFORMATION PROCESSING APPARATUS, INFORMATION PROCESSING SYSTEM, AND INFORMATION PROCESSING METHOD

(71) Applicant: Mana Ishikawa, Kanagawa (JP)

(72) Inventor: Mana Ishikawa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 292 days.

(21) Appl. No.: 17/880,668

(22) Filed: Aug. 4, 2022

(65) Prior Publication Data
US 2023/0072091 A1    Mar. 9, 2023

(30) Foreign Application Priority Data
Sep. 9, 2021 (JP) .................. 2021-147138

(51) Int. Cl.
*G06F 21/60* (2013.01)
*G06F 21/31* (2013.01)

(52) U.S. Cl.
CPC ............ *G06F 21/608* (2013.01); *G06F 21/31* (2013.01)

(58) Field of Classification Search
CPC .................. G06F 21/608; G06F 21/31; H04N 2201/0082; H04N 1/00331
USPC .......................................................... 726/26
See application file for complete search history.

(56) References Cited

U.S. PATENT DOCUMENTS

| 5,991,709 A * | 11/1999 | Schoen ................ G06Q 99/00 707/999.001 |
| 2007/0076984 A1 | 4/2007 | Takahashi et al. |
| 2009/0077617 A1 * | 3/2009 | Levow ................ H04L 51/212 726/1 |
| 2010/0259779 A1 | 10/2010 | Bellotti et al. |

(Continued)

FOREIGN PATENT DOCUMENTS

| JP | H0749924 A | 2/1995 |
| JP | H0916712 A | 1/1997 |

(Continued)

OTHER PUBLICATIONS

Extended European Search Report issued Jan. 20, 2023 in European Patent Application No. 22187464.7, 9 pages.

(Continued)

*Primary Examiner* — Jacob Lipman
(74) *Attorney, Agent, or Firm* — XSENSUS LLP

(57) ABSTRACT

An information processing apparatus, an information processing system, and an information processing method. The information processing apparatus communicates with an edge device communicably connected to the information processing apparatus, executes OCR processing on data input from the edge device, controls the edge device, authenticates a user, receives selection of data to be output to the edge device, stores the data output to the edge device, receives setting of data update rule, detects a modification from the data obtained by executing OCR processing according to the data update rule, stores a data history that indicates usage history of data input and output, determines original data input from the edge device among the stored data as target electronic data based on the data history, and updates the target electronic data based on the modification.

9 Claims, 8 Drawing Sheets

(56) References Cited

U.S. PATENT DOCUMENTS

| | | | | |
|---|---|---|---|---|
| 2013/0016376 A1* | 1/2013 | Hashidume | ............ | G03G 15/01 |
| | | | | 358/1.9 |
| 2013/0054222 A1* | 2/2013 | Sharma | .............. | G06V 30/1478 |
| | | | | 704/2 |
| 2013/0321352 A1* | 12/2013 | Muto | ....................... | G06F 3/041 |
| | | | | 345/179 |
| 2014/0053231 A1* | 2/2014 | Coles | .................... | G06F 21/604 |
| | | | | 726/1 |

FOREIGN PATENT DOCUMENTS

| | | |
|---|---|---|
| JP | 11-272654 | 10/1999 |
| JP | 2007-102545 | 4/2007 |
| JP | 2007183754 A | 7/2007 |
| JP | 2013-097624 | 5/2013 |

OTHER PUBLICATIONS

Japanese Office Action issued Mar. 25, 2025 in corresponding Japanese Patent Application No. 2021-147138 (5 pages; with English translation).

* cited by examiner

FIG. 9

Data Reflection

Data reflection failed due to competitive situation.

[ Check ]

[ Do not reflect competitive part. ]

[ Do not reflect at all. ]

FIG. 10

Data Reflection

Delete command issued at part already modified indicated in preview window. Do you want to delete?

Preview

AAAAAA

[ Do Not Delete ]  [ Delete ]  [ Manual Correction ]

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-147138, filed on Sep. 9, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

A technique has been developed to modify and update electronic data by reading writing on a sheet of paper or the like based on the electronic data output by using an edge device connected to a cloud service.

For example, a user registered in the cloud service sets rules for writing on the paper when printing out electronic data through the cloud service with the printer and scanner connected to the cloud service. As a result, writing on the paper is reflected in the original electronic data by scanning the paper with the scanner.

SUMMARY

Embodiments of the present disclosure describe an information processing apparatus, an information processing system, and an information processing method. The information processing apparatus communicates with an edge device communicably connected to the information processing apparatus, executes OCR processing on data input from the edge device, controls the edge device, authenticates a user, receives selection of data to be output to the edge device, stores the data output to the edge device, receives setting of data update rule, detects a modification from the data obtained by executing OCR processing according to the data update rule, stores a data history that indicates usage history of data input and output, determines original data input from the edge device among the stored data as target electronic data based on the data history, and updates the target electronic data based on the modification.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of the operation screen displayed for reflecting writing in the information processing system according to the embodiments of the present disclosure;

FIG. 10 is a diagram illustrating another example of the operation screen displayed for reflecting the writing in the information processing system according to the embodiments of the present disclosure;

Figure 1:
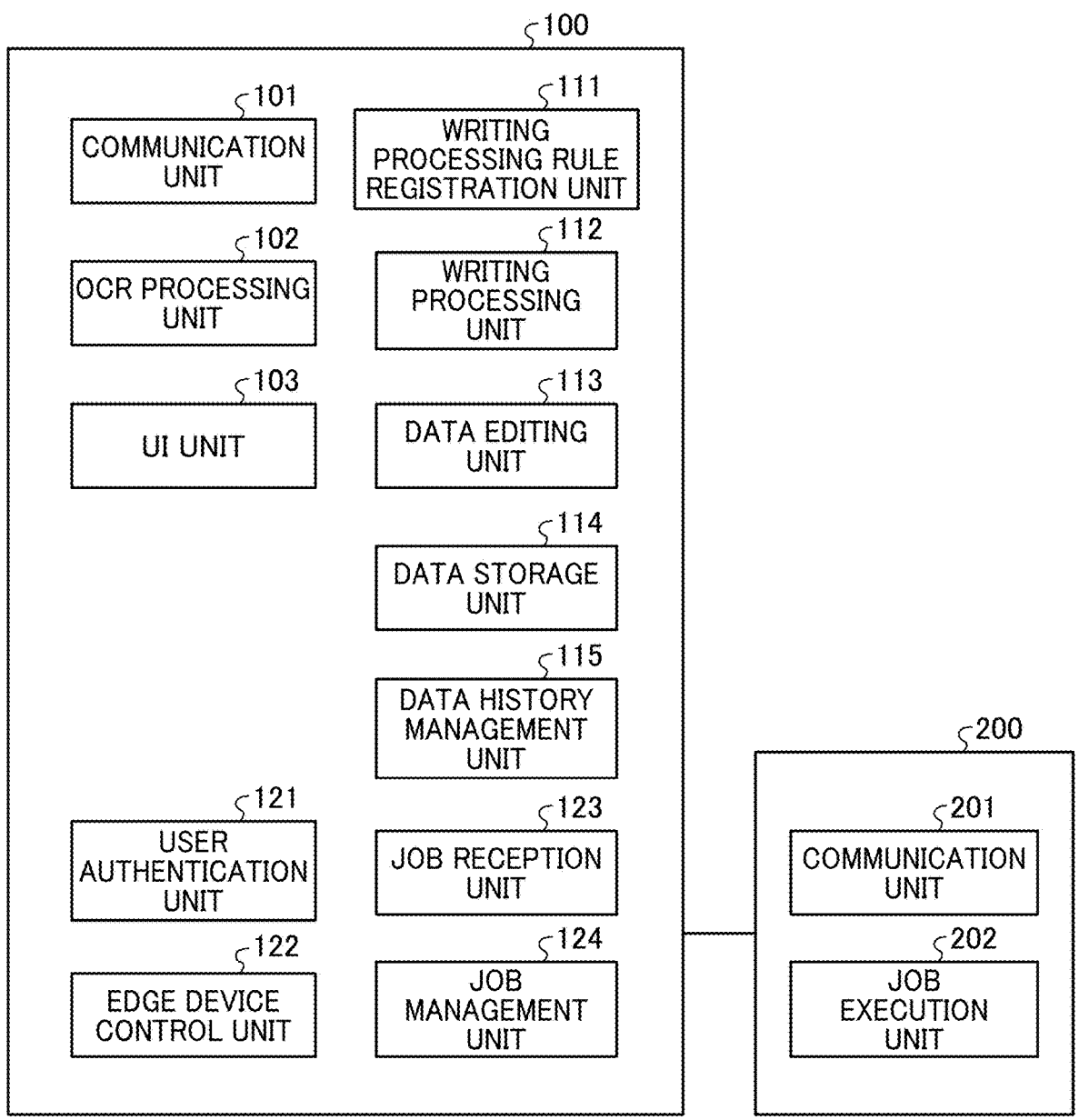
FIG. 1 is a block diagram illustrating an example of a functional configuration of an information processing system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of an information processing apparatus, an information processing system, and an information processing method.

FIG. 1 is a block diagram illustrating an example of a functional configuration of the information processing system according to the present embodiment. With reference to FIG. 1, an example of the functional configuration of the information processing system according to the present embodiment is described.

As illustrated in FIG. 1, the information processing system according to the present embodiment includes a cloud 100 and an edge device 200. In the present embodiment, the cloud 100 may include a cloud gateway. Further, in the present embodiment, the edge device 200 may be, for example, a personal computer (PC), a smartphone, a digital camera, a printer, a scanner, or a multifunction peripheral (MFP).

An example of a functional configuration of the edge device 200 is described in the following. The edge device 200 includes a communication unit 201 and a job execution unit 202.

The communication unit 201 communicates with an external apparatus such as the cloud 100. The job execution unit 202 interprets and executes a job received from the cloud 100 by the communication unit 201. A job executed by the job execution unit 202 differs for each edge device 200.

An example of the functional configuration of the cloud 100 (an example of the information processing apparatus) is described in the following. The cloud 100 includes a communication unit 101, an optical character recognition (OCR) processing unit 102, a user interface (UI) unit 103, a writing processing rule registration unit 111, a writing processing unit 112, a data editing unit 113, a data storage unit 114, a data history management unit 115, a user authentication unit 121, an edge device control unit 122, a job reception unit 123, and a job management unit 124.

The communication unit 101 is an example of a communication unit that communicates with an external apparatus such as the edge device 200.

The OCR processing unit 102 executes OCR processing of a document. Specifically, the OCR processing unit 102 is an example of a conversion unit that executes OCR processing on data input from the edge device 200 through the communication unit 1101. The UI unit 103 displays UIs related to various services provided by the cloud 100.

The writing processing rule registration unit 111 is an example of a settings reception unit that receives settings of a writing processing rule (an example of a data update rule) for data. Further, the writing processing rule registration unit 111 stores the writing processing rule in association with the user, the edge device 200, or the like that has set the writing processing rule. The writing processing unit 112 is an example of a calculation unit that detects a modification, a conversion method, and the like from the data for which OCR processing is executed according to the writing processing rule registered by the writing processing rule registration unit 111. Further, the writing processing unit 112 detects the modification based on the data history stored by the data history management unit 115 described below. Accordingly, the modification in the data is detected easily.

The data editing unit 113 reflects the modification and conversion method to the data history stored by the data history management unit 115 described below and the target electronic data, which is the original data input by the user, among the data stored in the data storage unit 114 described below. Specifically, the data editing unit 113 determines the target electronic data, which is the original data input from the edge device 200 among the data stored in the data storage unit 114 described below, based on the data history stored by the data history management unit 115 described below. The data editing unit 113 is an example of an update unit that updates the determined target electronic data based on the modification and the conversion method detected by the writing processing unit 112.

By using the data history, the data input from the edge device 200 such as the data printed on paper is associated with the target electronic data stored in the data storage unit 114. As a result, by using the cloud 100 linked with the edge device 200, the writing on the paper is reflected on the original data stored by the user in the cloud 100.

For example, the data editing unit 113 uses Robotic Process Automation (RPA) or the like as a method for updating data. In such a case, the data editing unit 113 generates a document correction command based on the detected modification and the target electronic data, and executes the document correction command by the RPA to update the target electronic data.

The data storage unit 114 is an example of a storage unit that stores the data output to the edge device 200 and the data (target electronic data) updated by the data editing unit 113. The data history management unit 115 stores the data history, which is the usage history of the data input to and output from the cloud 100. In the present embodiment, the data history management unit 115 stores the data history in association with the user who used the data, the edge device 200, and the like.

The user authentication unit 121 is an example of an authentication unit that authenticates a user before transmitting a job to the edge device 200. The edge device control unit 122 is an example of a device control unit that controls the edge device 200 communicably connected by the communication unit 101.

The job reception unit 123 receives data to be output to the edge device 200 from the user authenticated by the user authentication unit 121. In the present embodiment, the job reception unit 123 receives a job including a user ID, data to be output to the edge device 200, a security level selected by the user, and the like. The job management unit 124 manages the jobs received by the job reception unit 123.

Figure 2:
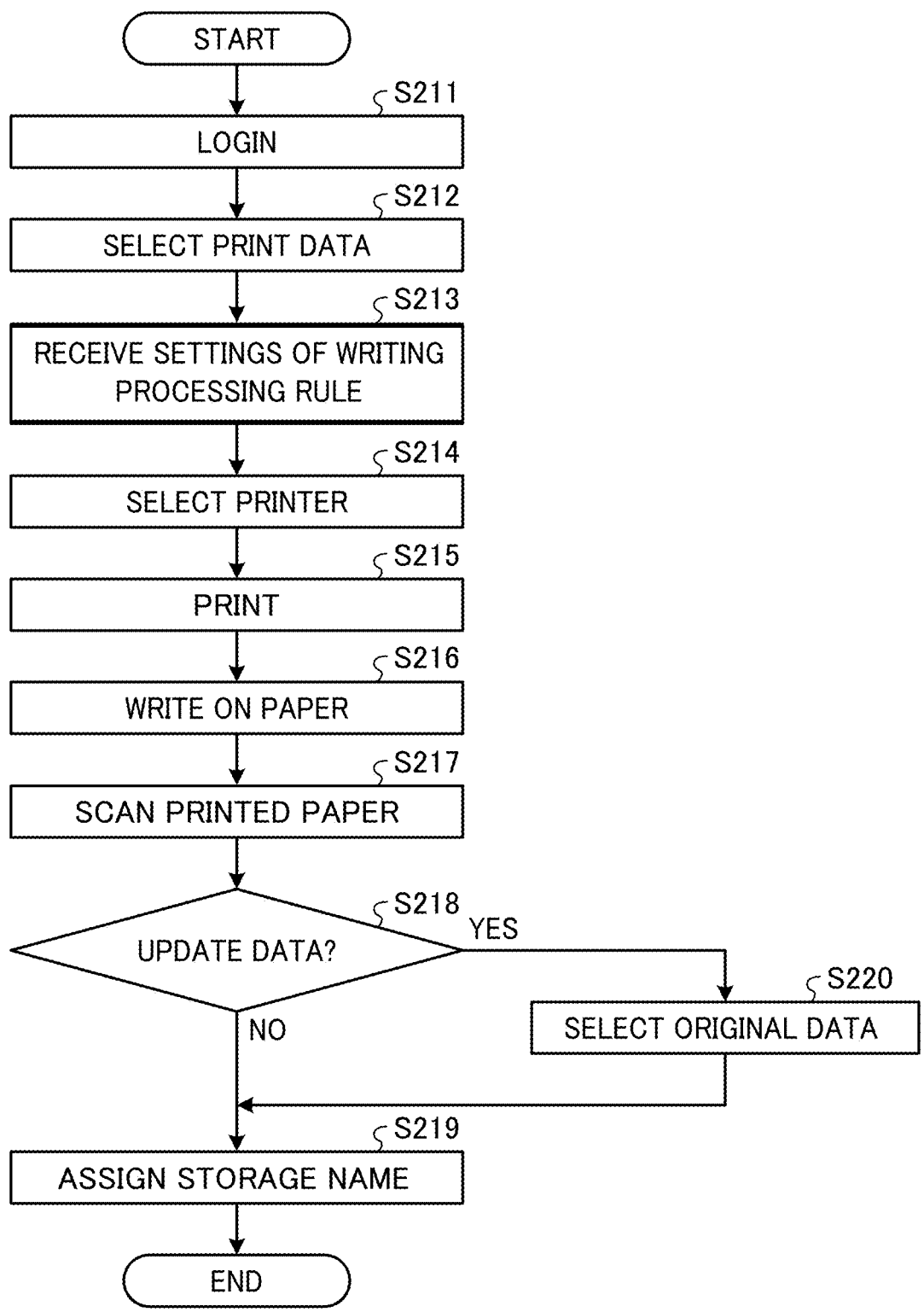
FIG. 2 is a flowchart illustrating an example of an operation process initiated by a user of the information processing system according to the embodiments of the present disclosure.

FIG. 2 is a flowchart illustrating an example of an operation process initiated by a user of the information processing system according to the present embodiment. With reference to FIG. 2, the example of the operation process initiated by the user of the information processing system according to the present embodiment is described.

In step S211, the user authentication unit 121 of the cloud 100 executes a login process including authentication of the user of the cloud 100. In step S212, the job reception unit 123 of the cloud 100 receives a selection of print data to be output to the edge device 200 (for example, a printer). The user may select print data from a cloud folder linked with the cloud 100, or may upload the print data to the cloud 100.

In step S213, the writing processing rule registration unit 111 of the cloud 100 receives settings of the writing processing rule for the print data. In step S214, the UI unit 103 receives a selection of a printer for printing the print data among the edge devices 200. In the present embodiment, any of the edge devices 200 linked with the cloud 100 may be selected. In one example, the UI unit 103 receives the selection of the edge device 200 from the user. In another example, the UI unit 103 automatically selects the edge device 200. Then, the communication unit 101 transmits a job including the print data to the selected printer.

In step S215, the job execution unit 202 of the edge device 200 (printer) prints the print data according to the job received from the cloud 100. In step S216, the user writes on a recording medium such as paper on which print data is printed, and in response to a selection of the edge device 200 for reading the paper or the like (for example, a scanner), the selected edge device 200 scans the paper with writing or the like in step S217.

Then, the communication unit 201 of the edge device 200 (scanner) transmits the scanned data to the cloud 100.

In response to input of data from the edge device 200 to the communication unit 101 of the cloud 100, the data editing unit 113 determines whether to update the original data (target electronic data) stored in the data storage unit 114 (target electronic data), in step S218. Based on a determination not to update the original data (NO in step S218), the data editing unit 113 assigns a storage name designated by the UI unit 103 to the received data in step S219 and stores the data in the data storage unit 114.

On the other hand, when updating the original data (YES in step S218), the data editing unit 113 selects (determines) the original data (target electronic data) from the data stored in the data storage unit 114 in step S220. Then, the data editing unit 113 updates the selected original data, assigns the storage name designated by the UI unit 103 to the updated original data in step S219, and stores the updated original data in the data storage unit 114.

Figure 3:
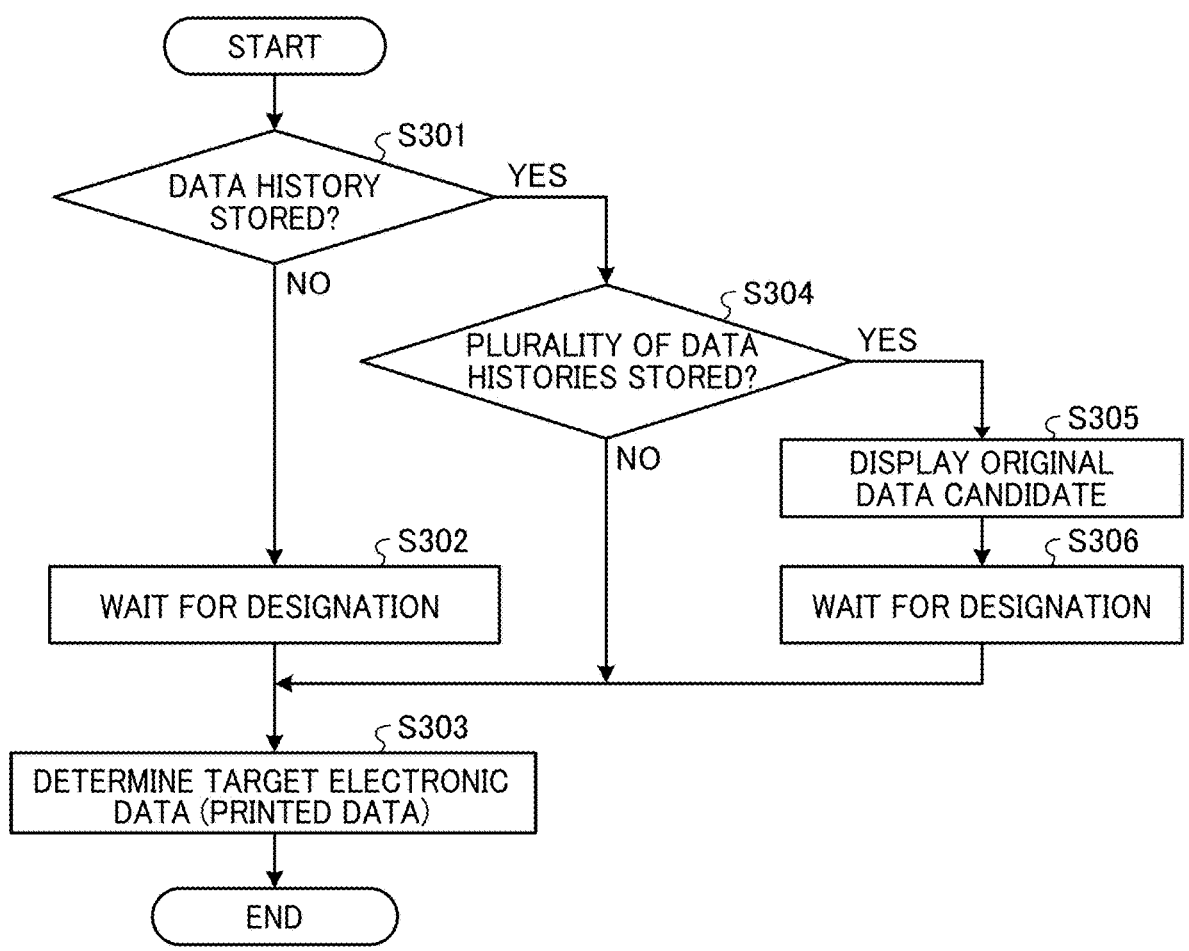
FIG. 3 is a flowchart illustrating an example of a determination process of target electronic data in the information processing system according to the embodiments of the present disclosure.

FIG. 3 is a flowchart illustrating an example of a determination process of the target electronic data in the information processing system according to the present embodiment. With reference to FIG. 3, an example of the determination process of the target electronic data in the information processing system according to the present embodiment is described.

In step S301, the data editing unit 113 determines whether a data history associated with the user or the edge device 200 is stored in the data history management unit 115. Based on a determination that the data history is not stored (NO in step S301), the data editing unit 113 waits for the target electronic data to be designated by the user in step S302. In step S303, the data editing unit 113 determines the data designated by the user as the target electronic data (data printed by the edge device 200).

On the other hand, based on a determination that the data history is stored (YES in step S301), the data editing unit 113 determines whether a plurality of the data histories is stored in step S304. Based on a determination that the plurality of data histories is not stored (NO in step S304), the data editing unit 113 determines the target electronic data from the data stored in the data storage unit 114 based on the data history in step S303.

In step S305, based on the determination that the plurality of data histories is stored (YES in step S304), the data editing unit 113 displays candidates of the original data (target electronic data) among the data stored in the data storage unit 114 based on the plurality of the data histories. In step S306, the data editing unit 113 waits for the target electronic data to be designated from the candidates of the original data by the user. In step S303, the data editing unit 113 determines the candidate of the original data designated by the user as the target electronic data.

Figure 4:
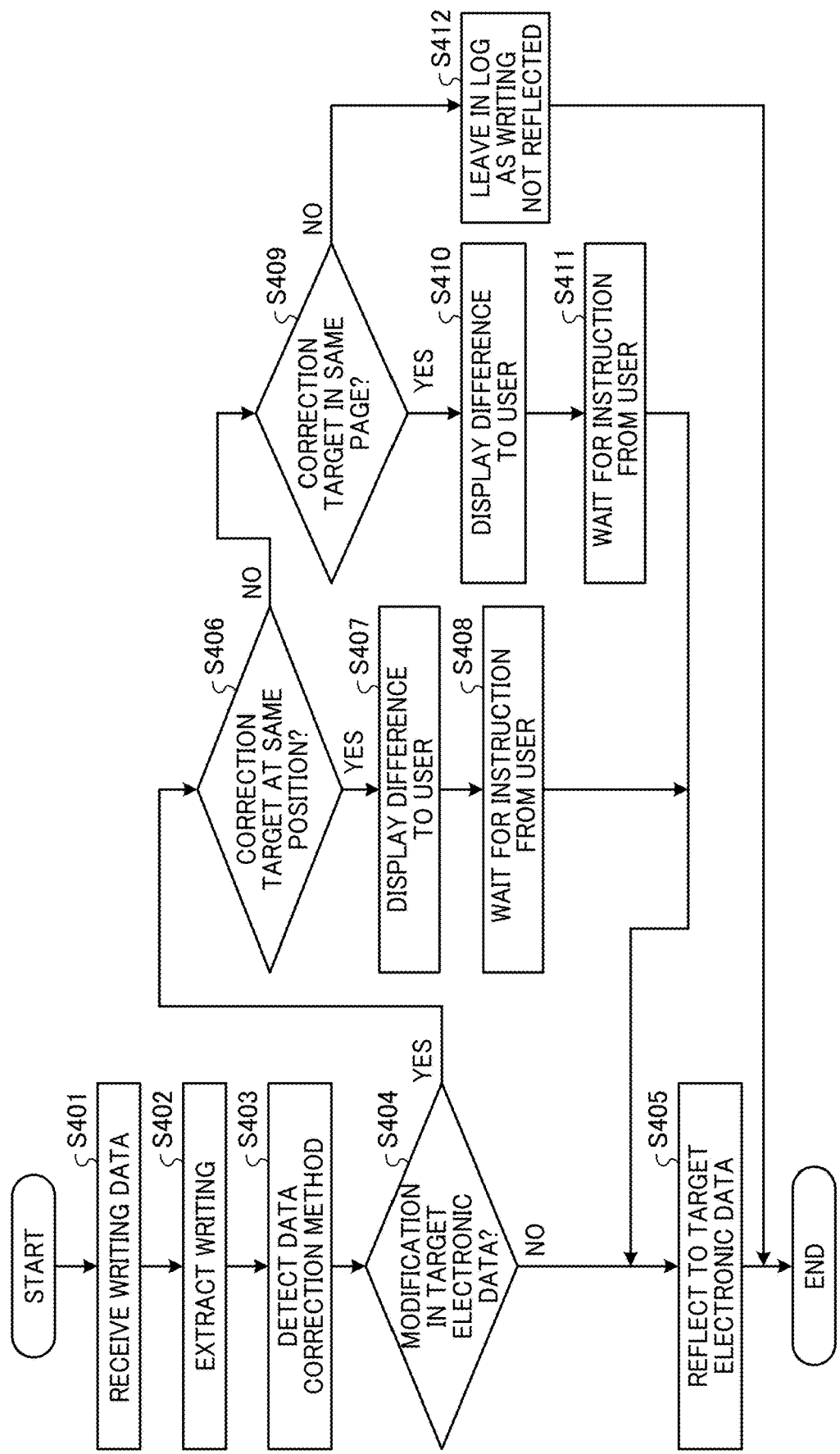
FIG. 4 is a flowchart illustrating an example of an update process of the target electronic data in the information processing system according to the embodiments of the present disclosure.

FIG. 4 is a flowchart illustrating an example of an update process of the target electronic data in the information processing system according to the present embodiment. With reference to FIG. 4, the example of the update process of the target electronic data in the information processing system according to the present embodiment is described.

In step S401, the OCR processing unit 102 receives data (writing data) input from the edge device 200 through the communication unit 101 and executes the OCR processing on the received writing data. In step S402, the writing processing unit 112 extracts writing from the writing data in which the OCR processing is executed. In step S403, the writing processing unit 112 detects a modification and conversion method (data correction method) from the extracted writing according to the writing processing rule.

In step S404, the data editing unit 113 determines whether there is the modification in the target electronic data based on the detected modification and conversion method. Based on a determination that there is no modification in the target electronic data (NO in step S404), the data editing unit 113 reflects the detected modification and conversion method in the target electronic data in step S405.

On the other hand, based on a determination that there is the modification in the target electronic data (YES in step S404), in other words, in the case there is a competitive situation in which the target electronic data is modified, since the target electronic data is printed, the data editing unit 113 determines whether there is the modification (correction target) of the target electronic data at the same position as the detected modification in step S406. Based on a determination that there is the modification of the target electronic data at the same position as the detected modification (YES in step S406), the data editing unit 113 displays the difference between the detected modification and the modification of the target electronic data in the UI unit 103 in step S407, and waits for an instruction from the user in step S408. The UI unit 103 is an example of a notification unit that requests the user to instruct the correction method in the case the difference between the detected modification and the target electronic data is found.

In step S405, the data editing unit 113 reflects the detected modification and conversion method in the target electronic data according to the instruction from the user. In other words, in the case the difference between the detected modification and the target electronic data is found, the data editing unit 113 updates the target electronic data in response to the instruction from the user. Accordingly, the data is updated as intended by the user.

Based on a determination that there is no modification in the target electronic data at the same position as the detected modification (NO in step S406), the data editing unit 113 determines whether there is a difference (correction target) from the detected modification in the target electronic data in step S409, and based on a determination that there is a correction target in the target electronic data (YES in step S409), the data editing unit 113 displays the correction target in the target electronic data in the unit 103 in step S410, and waits for an instruction from the user in step S411. In step S405, the data editing unit 113 reflects the detected modification and conversion method in the target electronic data according to the instruction from the user.

Based on a determination that there is no correction target in the target electronic data (NO in step S409), the data editing unit 113 leaves the detected modification and conversion method in a log as unreflected writing in step S412.

Figure 5:
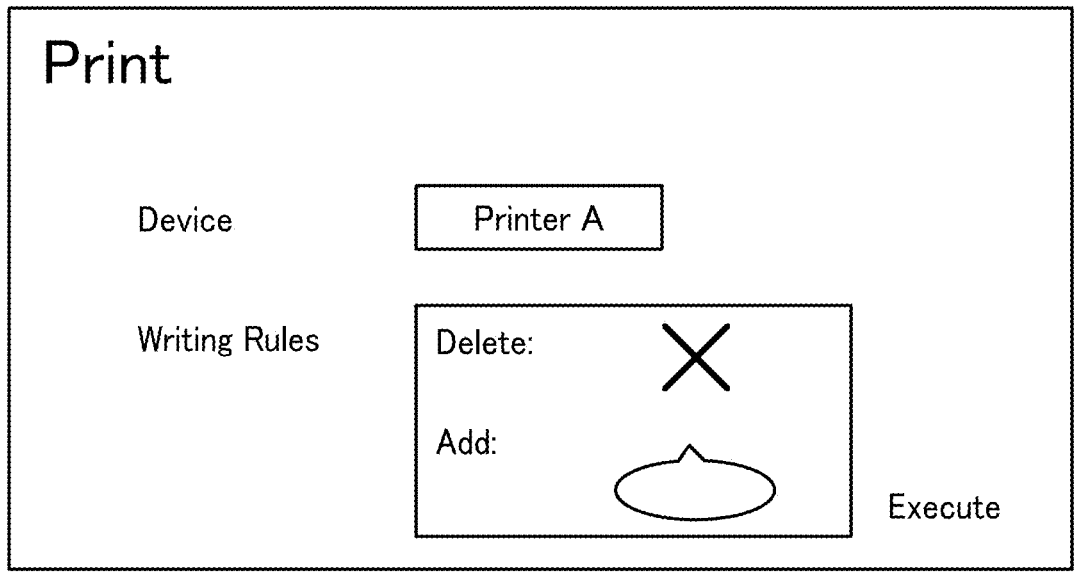
FIG. 5 is a diagram illustrating an example of an operation screen displayed for printing in the information processing system according to the embodiments of the present disclosure.
Figure 6:
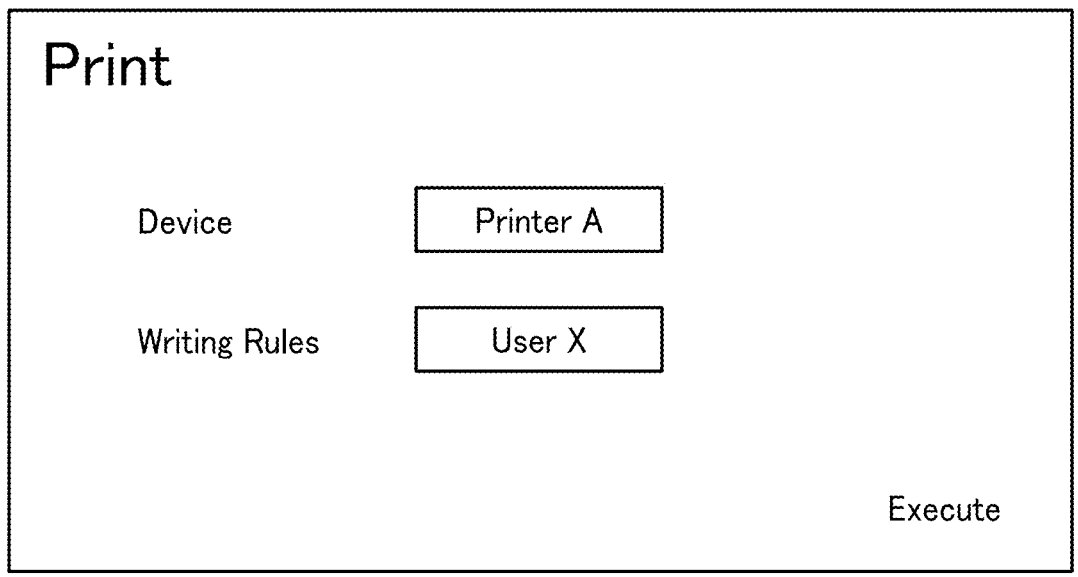
FIG. 6 is a diagram illustrating another example of the operation screen displayed for printing in the information processing system according to the embodiments of the present disclosure.

FIGS. 5 and 6 are diagrams illustrating examples of an operation screen at the time of printing in the information processing system according to the present embodiment. With reference to FIGS. 5 and 6, the examples of the operation screen displayed at the time of printing in the information processing system according to the present embodiment is described.

In the present embodiment, the operation screen is displayed on an external device such as a smartphone or a PC by using a browser or an application. For example, when printing data on the edge device 200, the writing processing rule registration unit 111 displays on the external device, the operation screen for setting a device to be used for printing data (for example, printer A) and the writing processing rule (for example, deletion and addition), as illustrated in FIG. 5. Then, the writing processing rule registration unit 111 receives the writing processing rule set on the operation screen.

Here, the writing processing rule may be selectable from the writing processing rules provided by the service in advance, or the user may draw a figure or the like on the operation screen and set the writing processing rule. Further, the writing processing rule may include in addition to delete, add, and modification, various writing processing rules such as copy, paste, font size modification, and commands to be operated on the data. Further, a writing processing rule preset by the user may be included as the writing processing rule. Further, as illustrated in FIG. 6, one user may set a plurality of writing processing rules, and a name (for example, user X) may be assigned to each writing processing rule to enable use of the writing processing rule.

Figure 7:
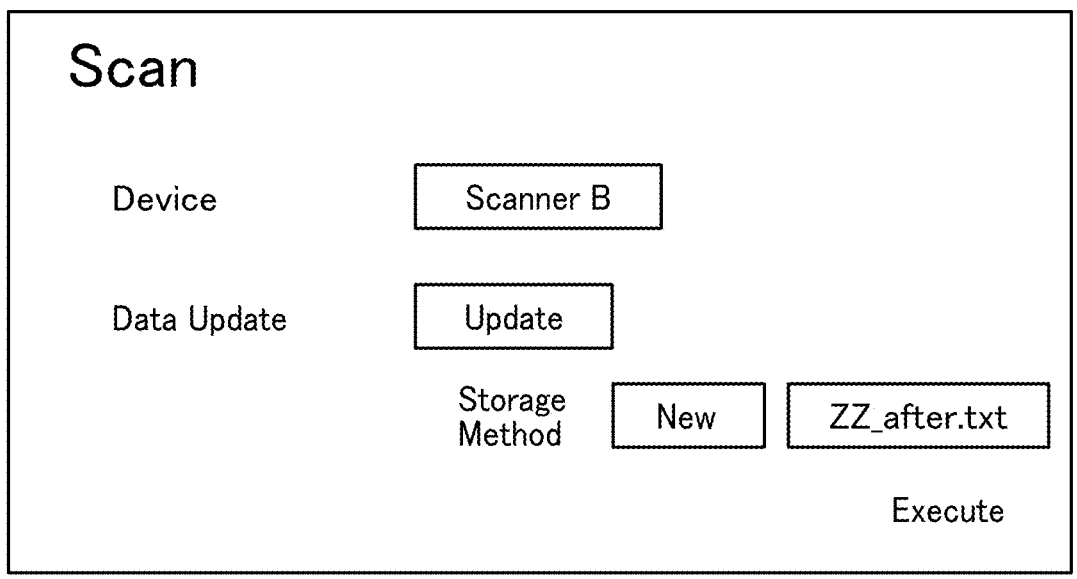
FIG. 7 is a diagram illustrating an example of the operation screen displayed for scanning in the information processing system according to the embodiments of the present disclosure.
Figure 8:
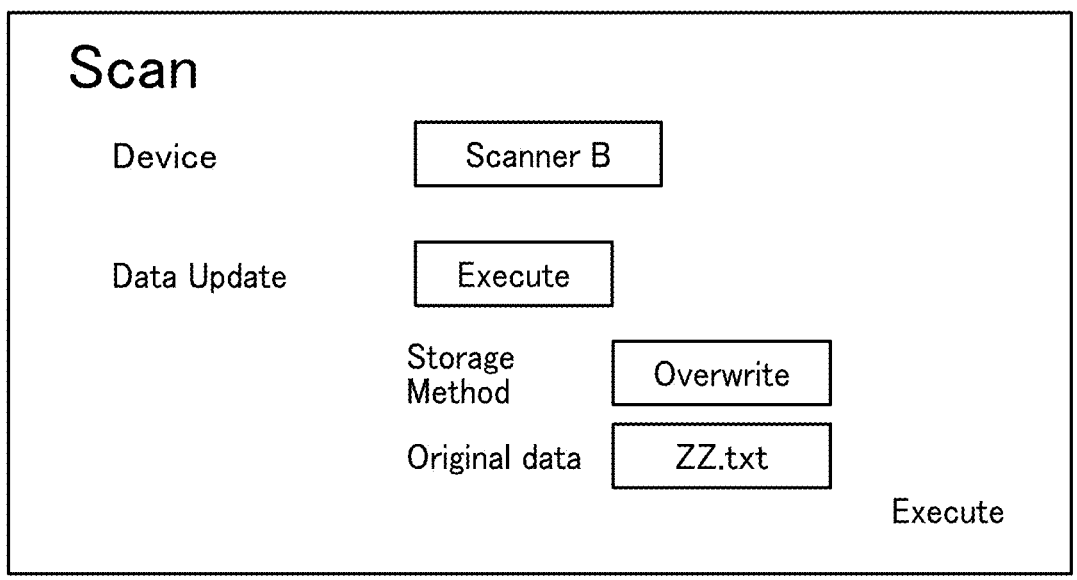
FIG. 8 is a diagram illustrating another example of the operation screen displayed for scanning in the information processing system according to the embodiments of the present disclosure.

FIGS. 7 and 8 are diagrams illustrating other examples of the operation screen at the time of scanning in the information processing system according to the present embodiment. With reference to FIGS. 7 and 8, the examples of the operation screen displayed at the time of scanning in the information processing system according to the present embodiment is described.

When scanning paper (recording medium) with writing in the edge device 200, the data editing unit 113 displays on the external device the operation screen for selecting the device (for example, a scanner B) used for scanning the paper with writing and for selecting whether to update the target electronic data according to the writing on the paper. In response to a selection to update the target electronic data according to the writing, the data editing unit 113 may display on the external device, the operation screen for setting the method of storing the target electronic data updated according to the writing. As illustrated in FIG. 7, the data editing unit 113 displays an operation screen for assigning a file name (for example, ZZ_after.txt) to store the target electronic data updated according to the writing as a new file in response to a determination of the target electronic data based on the user's data history.

The cloud service may store the target electronic data before the update based on the user information, but the cloud 100 may not store the usage history of the output data from the viewpoint of security or the like. In this case, the data editing unit 113 may display on the external device, an operation screen for selecting the target electronic data corresponding to the data to be scanned by the edge device 200 from the data stored in the data storage unit 114, as illustrated in FIG. 8. In this case, the file name for the target electronic data is not assigned because the writing is reflected by overwriting the selected target electronic data.

FIGS. 9 to 12 are diagrams illustrating examples of the operation screen displayed in response to a reflection of the writing in the information processing system according to the present embodiment. With reference to FIGS. 9 to 12, the examples of the operation screen displayed at the time of reflecting the writing in the information processing system according to the present embodiment is described.

In the case a competitive situation in which the target electronic data is modified after the target electronic data is printed is found after detecting the modification and correction method for the data (scan data) input from the edge device 200, the data editing unit 113 displays the operation screen illustrated in FIG. 9 on the external device. Specifically, as illustrated in FIG. 9, the data editing unit 113 displays the operation screen indicating that the competitive situation has occurred in the target electronic data and enabling selection whether to reflect the modification in the target electronic data.

In response to a selection by the user to reflect the modification in the target electronic data, the data editing unit 113 displays a preview window for identifying the modification in the target electronic data as illustrated in FIG. 10. Alternatively, the data editing unit 113 may display a preview window capable of comparing the target electronic data and the scanned data. In this case, a marker or the like may be attached to the modification of the target electronic data to identify the modification. Further, as illustrated in FIG. 10, the data editing unit 113 may include a button on the operation screen for selecting whether to modify the target electronic data.

Figure 12:
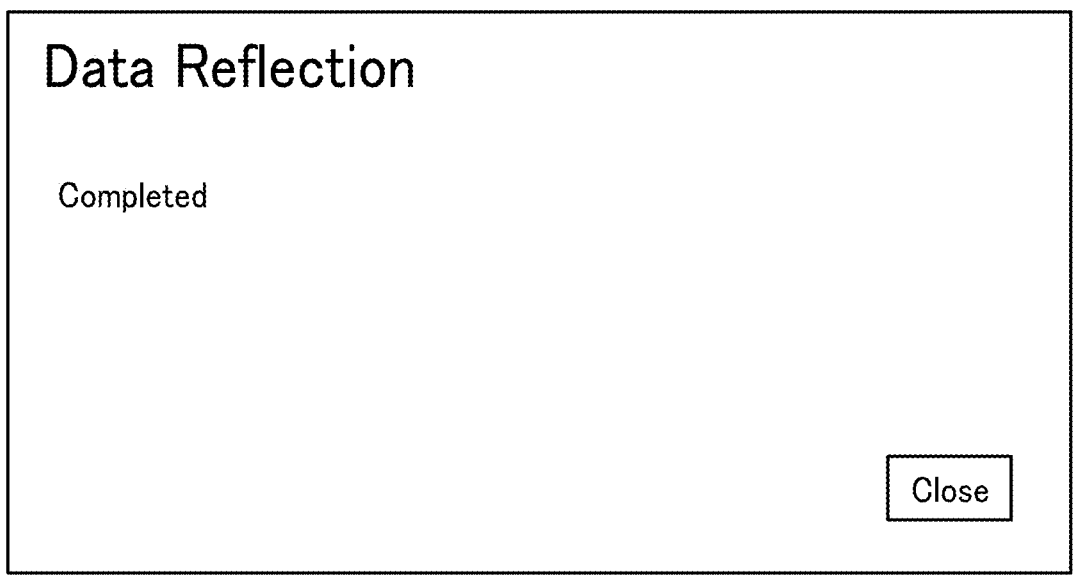
FIG. 12 is a diagram illustrating another example of the operation screen displayed for reflecting the writing in the information processing system according to the embodiments of the present disclosure.

In response to a selection not to modify the target electronic data and in the case there is no other modification in the target electronic data, the data editing unit 113 displays an operation screen indicating that the update of the target electronic data has been completed on the external device as illustrated in FIG. 12.

Figure 11:
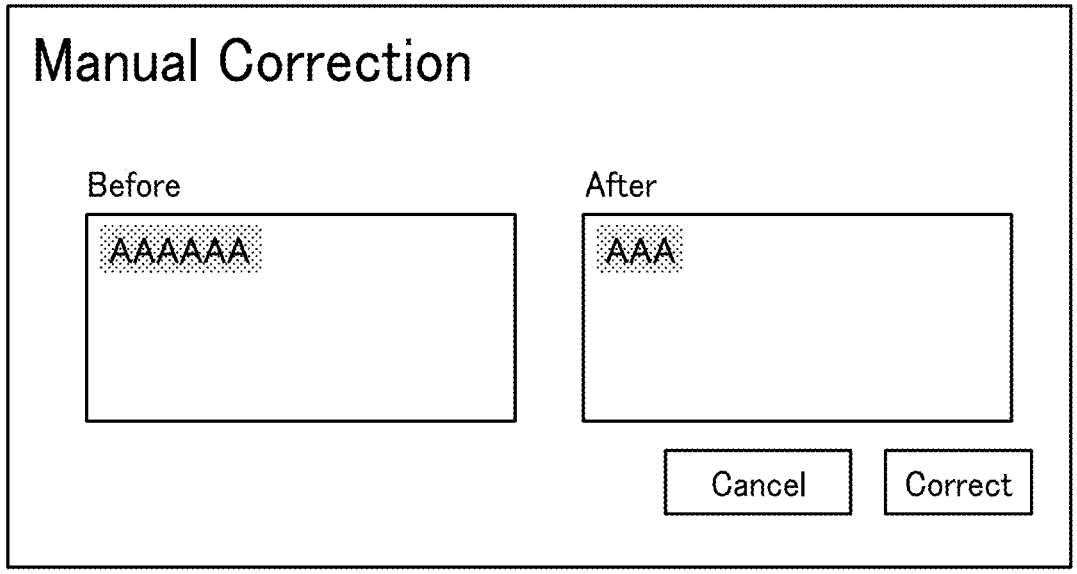
FIG. 11 is a diagram illustrating another example of the operation screen displayed for reflecting the writing in the information processing system according to the embodiments of the present disclosure.

On the other hand, in response to a selection to modify the target electronic data, the data editing unit 113 updates the target electronic data according to the detected modification and conversion method. In response to a selection by the user to make manual correction, the data editing unit 113 displays on the external device, an operation screen for inputting the modification and conversion method of the target electronic data as illustrated in FIG. 11. Then, the data editing unit 113 updates the target electronic data according to the modification and conversion method input on the operation screen. Then, the data editing unit 113 displays an operation screen indicating that the update of the target electronic data has been completed on the external device as illustrated in FIG. 12.

As described above, according to the information processing system of the present embodiment, the data input from the edge device 200 such as the data printed on paper and the target electronic data are stored in association with each other in the data storage unit 114 by using the data history. As a result, by using the cloud 100 linked with the edge device 200, the writing on the paper is reflected on the original data stored by the user in the cloud 100.

The apparatuses or devices described in one or more embodiments are just one example of plural computing environments that implement the one or more embodiments disclosed herein. In some embodiments, the cloud 100 includes multiple computing devices such as a server cluster. The plurality of computing devices is configured to communicate with one another through any type of communication link, including a network, shared memory, etc., and perform the processes disclosed herein. Similarly, the edge device 200 may include multiple computing devices configured to communicate with one another.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.) Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
communicate with an edge device communicably connected to the information processing apparatus;
execute OCR processing on data input from the edge device;
control the edge device;
authenticate a user;
receive selection of data to be output to the edge device;
store the data output to the edge device;
receive setting of data update rule from a user and store the data in association with the user, the data update rule including a correction command to correct text within the data;
detect a modification from the data obtained by executing OCR processing according to a modification or conversion method specified by the data update rule, including correcting the text within the data;
store a data history that indicates usage history of data input and output;
determine target electronic data, which is original data of the data input from the edge device, among the stored data based on the data history;
determine whether another modification is present at a same position where the detected modification is present after printing is executed based on the data to be output to the edge device;
in a case that the another modification is determined to be present at the same position where the detected modification is present, display an operation screen allowing selection of whether to reflect the another modification to the target electronic data; and
in a case that reflecting the another modification is selected on the operation screen, update the target electronic data based on the modification.

2. The information processing apparatus of claim 1, wherein the circuitry is further configured to transmit a request to instruct a data correction method in case a difference between the modification and the target electronic data is found.

3. The information processing apparatus of claim 1, wherein the circuitry is further configured to update the target electronic data based on an instruction from the user to correct a difference between the modification and the target electronic data.

4. The information processing apparatus of claim 1, wherein the circuitry is further configured to detect the modification based on the data history.

5. The information processing apparatus of claim 1, wherein the data update rule includes deleting text, adding text, or modifying font size of the text.

6. An information processing system comprising an edge device and an information processing apparatus communicably connected with each other, the edge device including:
circuitry configured to:
communicate with the information processing apparatus; and
the information processing apparatus including:
circuitry configured to:
communicate with the edge device;
execute OCR processing on data input from the edge device;
control the edge device;
authenticate a user;
receive selection of data to be output to the edge device;
store the data output to the edge device;
receive setting of data update rule from a user and store the data in association with the user, the data update rule including a correction command to correct text within the data;
detect a modification from the data obtained by executing OCR processing according to a modification or conversion method specified by the data update rule;
store a data history that indicates usage history of data input and output;
determine target electronic data, which is original data input from the edge device among the stored data based on the data history;
determine whether another modification is present at a same position where the detected modification is present after printing is executed based on the data to be output to the edge device;
in a case that the another modification is determined to be present at the same position where the detected modification is present, display an operation screen allowing selection of whether to reflect the another modification to the target electronic data; and
in a case that reflecting the another modification is selected on the operation screen, update the target electronic data based on the modification.

7. The information processing system of claim 6, wherein the data update rule includes deleting text, adding text, or modifying font size of the text.

8. An information processing method executed by an information processing apparatus, the method comprising:
communicating with an edge device communicably connected with the information processing apparatus;
executing OCR processing on data input from the edge device;
controlling the edge device;
authenticating a user;
receiving selection of data to be output to the edge device;
storing the data output to the edge device;
receiving setting of data update rule from a user and store the data in association with the user, the data update rule including a correction command to correct text within the data;
detecting a modification from the data obtained by executing OCR processing according to a modification or conversion method specified by the data update rule;
storing a data history that indicates usage history of data input and output;
determining target electronic data, which is original data input from the edge device among the stored data based on the data history;

determining whether another modification is present at a same position where the detected modification is present after printing is executed based on the data to be output to the edge device;

in a case that the another modification is determined to be present at the same position where the detected modification is present, displaying an operation screen allowing selection of whether to reflect the another modification to the target electronic data; and in a case that reflecting the another modification is selected on the operation screen, updating the target electronic data based on the modification.

9. The information processing method of claim 8, wherein the data update rule includes deleting text, adding text, or modifying font size of the text.

* * * * *